E. R. HUNTLEY.
GEARING.
APPLICATION FILED JULY 6, 1920.
1,425,496.
Patented Aug. 8, 1922.
Fig. I.
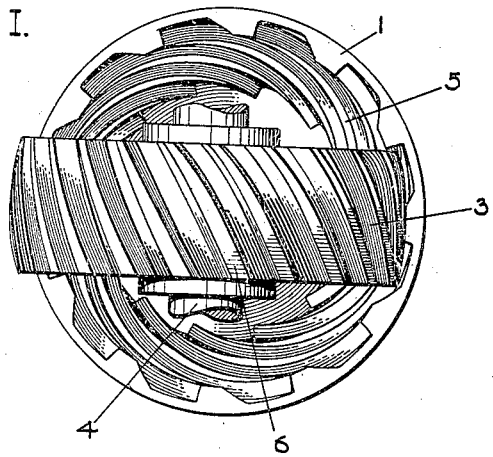
Fig. III.
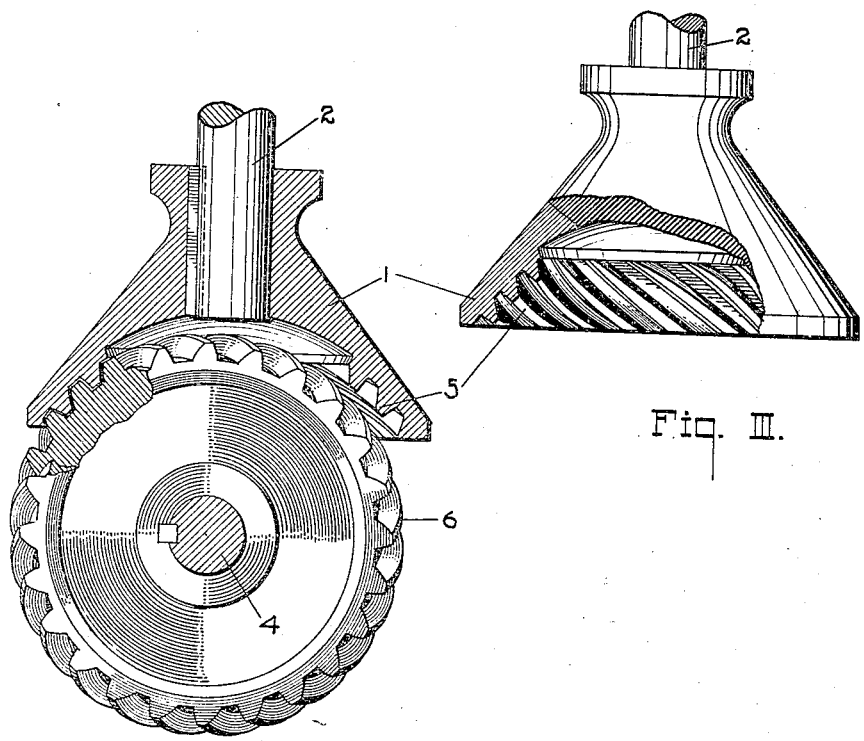
Fig. II.
INVENTOR.
Ernest R. Huntley.
BY Chester H Braselton
ATTORNEYS.

UNITED STATES PATENT OFFICE.

ERNEST R. HUNTLEY, OF MILWAUKEE, WISCONSIN, ASSIGNOR TO INDUSTRIAL RESEARCH CORPORATION, OF TOLEDO, OHIO, A CORPORATION OF DELAWARE.

GEARING.

1,425,496.   Specification of Letters Patent.   Patented Aug. 8, 1922.

Application filed July 6, 1920. Serial No. 394,075.

*To all whom it may concern:*

Be it known that I, ERNEST R. HUNTLEY, a citizen of the United States, residing at Milwaukee, county of Milwaukee, and State of Wisconsin, have invented certain new and useful Improvements in Gearing, of which I declare the following to be a full, clear, and exact description.

This invention relates to gearing, and particularly to gearing of the type employed for communicating rotation from one to another of two shafts having their axes of rotation relatively angled and with the speed of rotation of one shaft greater than that of the other.

The primary object of my invention is the provision of an improved form of gearing of the class described, which is especially adaptable and of value for use in connection with the driving of motor vehicles, is economical in its cost of production, and is especially quiet in operation regardless of the wearing of the teeth during use. A further object of the invention is the provision of a gear in which the teeth of both the drive and driven members have approximately the same wheel or contacting surface regardless of the ratio of the speed of rotation from one member to the other, thereby materially enhancing the practicability and commercial advantage thereof. Further objects and advantages of the invention will be apparent from the following detailed description thereof.

While the invention, in its broader aspect, is capable of embodiment in numerous forms, a preferred embodiment thereof is illustrated in the accompanying drawings, in which—

Figure I is a view of the gearing looking toward the face end of the drive gear, and Fig. II is a view thereof taken at right angles to the axis of the drive member and with parts in section.

Fig. III is a view in elevation of the driving element with parts broken away.

Referring to the drawing, 1 designates the drive gear which is carried by a shaft 2, and 3, the driven gear which is carried by a shaft 4, the axis of which is at right angles to that of the shaft 2 and at one side thereof.

The drive gear 1, which is of the crown type, has its working face concave and provided around or adjacent to the marginal edge thereof, with an annular set of teeth 5. These teeth extend from the outer edge of the set inward in spiral form with the spiral angularity or linear curvature of each tooth gradually increasing inwardly from its outer end, and with the width of each tooth gradually decreasing inwardly from its outer end. The linear curvature of each tooth bears such relation to the axis that if inwardly continued in the same gradually increasing curvature it would substantially meet or intersect the gear axis. The addendum curve of the tooth set is of concave form to fit over a portion of the driven gear, as shown.

The driven gear 3 has its peripheral surface convex in cross section in conformity or in concentric relation to the concavity of the drive gear, and the teeth 6 thereof, as they cross the face of the gear, in addition to being curved to conform to the transverse peripheral curve of the gear face are also curved from one end to the other thereof circumferentially of the gear with such curve increasing in angularity relative to the axis of the gear and toward the end of each tooth which first enters the teeth of the drive gear upon a turning of the same in a forward driving or right hand turning direction. The ends of the teeth which have the greatest angularity may therefore be termed the forward ends thereof. The addendum faces of the teeth also gradually decrease in width from their rear ends forward, or in a reverse direction to the increase in the linear angularity thereof.

It is apparent from the above and from an inspection of the drawings, that as the teeth of the two gears first start engagement one with another they present opposing working faces of different linear curvature, one gradually increasing, while the other decreases in curvature, and as the engaging movements of the teeth continue, they gradually assume concentric curved working relation. At the point of engagement where a tooth of one gear is disposed in central longitudinal relation to a tooth of the other gear, a bearing the full length of the tooth of the driven gear is effected. As the teeth move from central longitudinal engagement, the amount of linear contact surface of one with the other gradually decreases, so that the teeth leave contact with the same slight linear rolling motion with which they enter, thereby effecting a very silent engagement and producing a gearing in which the tendency toward the exclusion of a lubricant and the promotion of cutting between the teeth of the opposite members is reduced to a minimum.

The gearing which I have produced is exceedingly smooth and quiet in its running, and the meshing of the teeth is such that either gear may act as the driver, thereby facilitating a coacting action when used in the drive mechanism of automobiles.

I am aware that the particular embodiment of my invention above described, and illustrated in the accompanying drawings, is susceptible of considerable variation without departing from the spirit thereof, and therefore I desire to claim my invention broadly as well as specifically as indicated by the appended claims.

I claim as my invention:

1. In a gearing of the class described, the combination of a wheel and a rotatable member having its axis of rotation transverse to that of the wheel, said wheel having its periphery convex in cross section and provided with a set of teeth, each tooth being on a line of constantly increasing angularity with the axis of said wheel, and said member having its crown face concave and provided with teeth for meshing with said wheel teeth, each tooth of said wheel having complete bearing on the corresponding tooth of said member only when positioned at approximately the middle point of said member tooth.

2. In a gearing of the class described, a drive gear having a concave crown face provided with an annular set of teeth concentric to its axis, and a driven gear having its periphery convex in cross section and provided with an annular set of teeth in mesh with the teeth of the drive gear, the axes of said gears being angularly disposed, the teeth of the drive gear extending inward spirally in gradually increasing angularity and the teeth of the driven member extending transversely of its periphery and being curved circumferentially thereof with the angularity of such curvature increasing from one end to the other, each tooth of said wheel having complete bearing on the corresponding tooth of said member only when positioned at approximately the middle point of said member tooth.

3. In a gearing of the class described, a drive gear having a concave crown face provided with an annular set of teeth concentric to its axis, a driven gear having its periphery convex in cross section and provided with an annular set of teeth in mesh with the teeth of the drive gear, the axes of said gears being angularly disposed, the teeth of the drive gear extending inward spirally in gradually increasing angularity and the teeth of the driven member extending transversely of its periphery and being curved circumferentially thereof with the angularity of such curvature increasing from one end to the other, and the teeth of said driven gear being of equal depth throughout their length.

4. In a gearing of the class described, a drive gear having a concave crown face provided with an annular set of teeth concentric to its axis, and a driven gear having its periphery convex in cross section and provided with an annular set of teeth in mesh with the teeth of the drive gear, the axes of said gears being angularly disposed, the teeth of the drive gear extending inward spirally in gradually increasing angularity and the teeth of the driven member extending transversely of its periphery and being curved circumferentially thereof with the angularity of such curvature increasing from one end to the other, and the addendum faces of the teeth of both gears gradually narrowing with the increase in angularity thereof.

5. In a gearing of the class described, a drive gear having a concave crown face provided with an annular set of teeth concentric to its axis, a driven gear having its periphery convex in cross section and provided with an annular set of teeth in mesh with the teeth of the drive gear, the axes of said gears being angularly disposed, the teeth of the drive gear extending inward spirally in gradually increasing angularity and the teeth of the driven member extending transversely of its periphery and being curved circumferentially thereof with the angularity of such curvature increasing from one end to the other, the teeth of said driven gear being of equal depth throughout their length, and the addendum faces of the teeth of both gears gradually narrowing with the increase in angularity thereof.

6. In a gearing, two rotatable members having their axes disposed at right angles to each other and out of intersecting relation, said gears having meshing crown and peripheral teeth respectively with the teeth of both gears respectively curved from one end to the other in the plane of rotation and with increasing angularity, the teeth of said gears having complete bearing between each other only when their teeth centers are adjacent.

7. In a gearing, two rotatable members having their axes disposed at right angles to each other and out of intersecting relation, said gearing having meshing crown and peripheral teeth respectively with the teeth of both gears respectively curved from one end to the other in the plane of rotation and with increasing angularity, and with the tooth set of one gear convex and the tooth set of the other gear concave, the teeth of said gears having complete bearing between each other only when their teeth centers are adjacent.

8. In a gearing, two rotatable members having their axes disposed at right angles to each other and out of intersecting relation, said gears having meshing crown and peripheral teeth respectively with the teeth of both gears respectively curved from one end to the other in the plane of rotation and with increasing angularity, and with the teeth of each gear decreasing in width at their outer faces as the said angularity thereof increases.

9. In a gearing, two rotatable members having their axes disposed at right angles to each other and out of intersecting relation, said gears having meshing crown and peripheral teeth respectively with the teeth of both gears respectively curved from one end to the other in the plane of rotation and with increasing angularity, with the tooth set of one gear convex and the tooth set of the other gear concave, and the teeth of each gear decreasing in width at their outer faces as the said angularity thereof increases.

In testimony whereof, I affix my signature.

ERNEST R. HUNTLEY.